F. MEIER.
Horseshoe.

No. 220,937.  Patented Oct. 28, 1879.

Witnesses
Fred G. Dieterich
Will R. Omohundro

Inventor
Felix Meier

UNITED STATES PATENT OFFICE.

FELIX MEIER, OF DETROIT, MICHIGAN.

IMPROVEMENT IN HORSESHOES.

Specification forming part of Letters Patent No. 220,937, dated October 28, 1879; application filed October 19, 1878.

*To all whom it may concern:*

Be it known that I, FELIX MEIER, of Detroit, in the county of Wayne and State of Michigan, have invented a new and useful Improvement in Horseshoes with Protection-Tops, which improvement is fully set forth in the following specification, reference being had to the accompanying drawings, in which—

Figure 1:
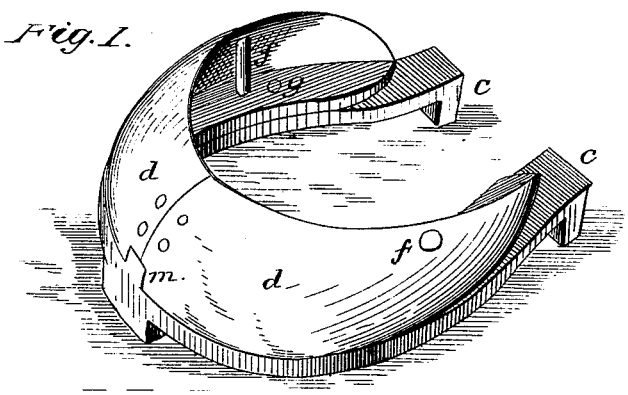
Figure 2:
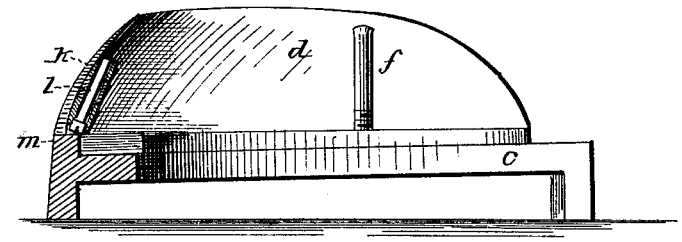
Figure 3:
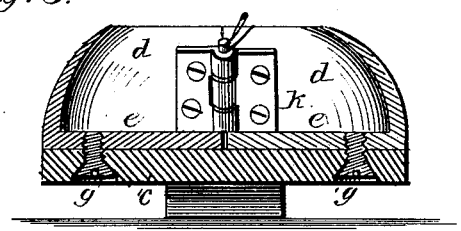
Figure 4:
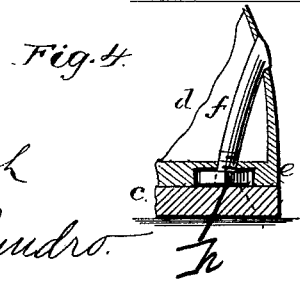

Figure 1 is a perspective view of my improved horseshoe. Fig. 2 is a vertical longitudinal section thereof. Fig. 3 is a vertical transverse section of the same, and Fig. 4 is a detail view thereof.

This invention has relation to improvements in horseshoes, referring more particularly to the manner of adjusting and holding the shoe on the foot; and it consists of a two-part socket, with its parts hinged together, and its sides, near the rear ends thereof, provided with oblique bolts adapted to both strengthen the socket and secure it to the horse's foot, substantially as hereinafter more fully set forth.

In the accompanying drawings, C C refer to an ordinary horseshoe, with its upper forward end provided with a lug, $m$, which enters a corresponding recess in the same end of the foot-socket to enable the holding of the shoe, while being secured to the socket, against lateral displacement.

$d\,d$ refer to a two-part socket, which is adapted to fit and receive the horse's foot. This socket has its parts hinged together at their forward ends, as at $k\,l$, Figs. 2 and 3, to permit them to be spread apart and fitted on the horse's foot. The hinge is on the inside of the socket, concealing it from view, and thus avoiding a cumbersome appearance. The socket is now fastened to the foot or hoof of the horse by passing bolts $f$ obliquely through the sides of the socket, near its rear ends, as clearly shown in detail in Fig. 4, one end of said bolts being countersunk in the upper part of the socket, while their lower ends are nutted, as at $h$, Fig. 4, in recesses in the under side of the flange $e$ of the socket. These oblique bolts $f$ enter notches cut in the hoof, and thus secure the socket to the hoof or foot of the horse. These bolts also serve to strengthen the parts of the socket at their rear end.

The shoe is secured to the socket by the insertion of screws $g\,g$ through the shoe, (see Fig. 3,) entering the inwardly-projecting flange or bottom $e$ of the socket.

The socket may be nickel-plated, silver-plated, or gold-plated, as the taste of the owner may dictate.

What I claim as new, and desire to secure by Letters Patent, is—

The horseshoe-socket $d\,d$, formed into two parts, which are hinged together and provided with the oblique bolts $f$, with their upper ends countersunk in the upper part of said socket and nutted at their lower ends in the under side of the inwardly-projecting flange $e$ of said socket, substantially as and for the purpose set forth.

FELIX MEIER.

Witnesses:
F. W. WRIGHT,
F. A. FISHER.